(No Model.)
C. T. REDFIELD.
STOVEPIPE DAMPER.
No. 502,203. Patented July 25, 1893.
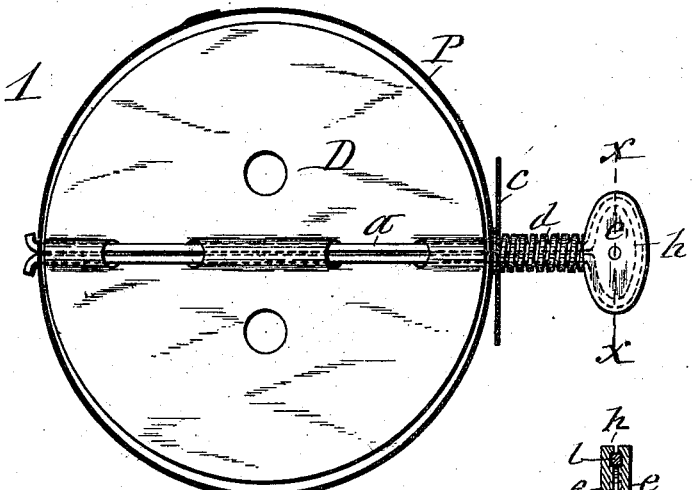
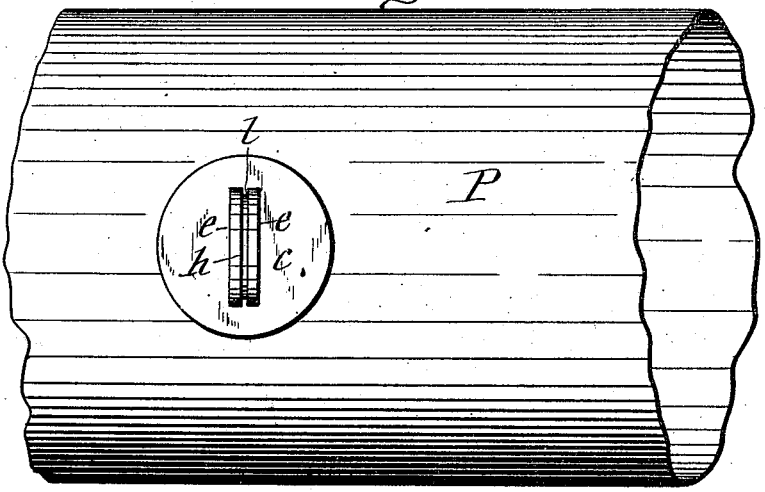
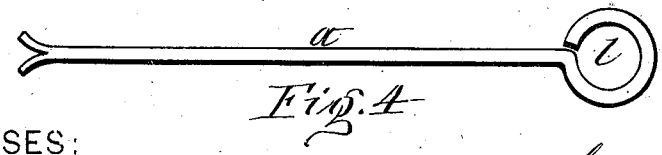
WITNESSES:
C. L. Bendixon
Mark W. Dewey
INVENTOR:
Charles T. Redfield
By E. Laass
his ATTORNEY.

UNITED STATES PATENT OFFICE.

CHARLES T. REDFIELD, OF GLEN HAVEN, NEW YORK.

STOVEPIPE-DAMPER.

SPECIFICATION forming part of Letters Patent No. 502,203, dated July 25, 1893.

Application filed March 20, 1893. Serial No. 466,830. (No model.)

*To all whom it may concern:*

Be it known that I, CHARLES T. REDFIELD, of Glen Haven, in the county of Cayuga and State of New York, have invented new and useful Improvements in Stovepipe-Dampers, of which the following, taken in connection with the accompanying drawings, is a full, clear, and exact description.

This invention consists in a novel attachment of a damper to the pipe whereby said pipe becomes compressed diametrically on the line of the shaft and the resilience thereof is utilized for confining the damper in its various adjusted positions and at the same time the edges of the damper are freed from contact with the pipe by the aforesaid crompression and consequent elongation of the pipe at right angles to the shaft, and thus the liability of the damper becoming unduly bound in the pipe is obviated.

The invention also consists in a novel construction of the handle of the damper and other features of novelty, all as hereinafter more fully described and specifically set forth in the claims.

In the annexed drawings Figure 1 is an end view of a section of a stove-pipe provided with my improved damper in its closed position. Fig. 2 is a side view of the same. Fig. 3 is a transverse section on line $x, x$, in Fig. 1, and Fig. 4 is a detached plan view of a modification of the damper-shaft.

Similar letters of reference indicate corresponding parts.

P— represents the stove-pipe and —D— the damper, which latter may be composed of either wrought, cast or malleable iron. Said damper is of a smaller diameter than that of the interior of the pipe, as clearly shown in Fig. 1 of the drawings, for the purpose hereinafter explained.

$a$— denotes the shaft of the damper. Said shaft is formed of a wrought iron rod either double as shown in Fig. 1 of the drawings or single as represented in Fig. 4 of the drawings. It may be attached to the damper in any suitable manner so as to compel the same to turn with the shaft. This shaft passes through the pipe and if said shaft is formed of a single piece one of the protruding ends thereof is split longitudinally and spread apart to form a bearing on the exterior of the pipe. When the shaft is formed of a rod bent double, the protruding ends thereof are spread apart in the same manner and for the same purpose. The opposite protruding end I provide with a handle —$h$— and with a shoulder bearing on the exterior of the pipe. The two bearings on opposite sides of the pipe compress the same diametrically on the line of the shaft, said compression being allowed by the smaller diameter of the damper than that of the interior of the pipe. The resilience of said pipe subjects the said bearings to sufficient friction to sustain the damper in its adjusted position, and at the same time elongates the pipe transversely so as to hold it out of contact with the edges of the damper at opposite sides of the shaft, and thus obviates the liability of the damper becoming bound in the pipe.

I do not wish to be limited to the splitting and spreading of the end of the shaft for the purpose of forming the aforesaid bearing on the exterior of the pipe, inasmuch as the same result can be attained by forming a head on said end of the shaft. The bearing on the opposite end of the shaft I preferably form of a shield —$c$— which is mounted on the shaft and pressed against the pipe by a spiral spring —$d$— interposed between the handle —$h$— and shield and surrounding the shaft. Said spring together with the resilience of the compressed pipe forms a partial lock to the damper and effectually sustains the same in its desired position. The chief purpose of the shield, however, is to protect the handle —$h$— from the heat of the pipe. This handle is formed by bending the rod of which the shaft is composed into the shape of a loop —$l$— upon opposite sides of which I place separate disks —$e$—$e$— of wood or other suitable material which is a poor heat-conducting material. These disks I press upon the loop —$l$— so as to cause the latter to become partially embedded in the disks and thus obtain a firm hold thereon. These disks are fastened to the loop by a rivet or rivets —$i$— passing through the disk and loop as shown in Fig. 3 of the drawings.

Having described my invention, what I claim as new, and desire to secure by Letters Patent, is—

1. The combination, with a stove-pipe, of a damper smaller in diameter than the interior of the pipe, and bearings on opposite ends of the damper-shaft compressing the pipe diametrically on the line of said shaft, whereby the pipe is made to pinch the edges of the damper adjacent to the shaft thereof, and the pipe is loosened from the edges of the damper on a line at right angles to the said shaft substantially as described and shown.

2. The combination with a stove-pipe and damper of the damper-shaft passing through the pipe and having one of its protruding ends provided with a bearing on the exterior of the pipe, a spring on said shaft compressing the pipe and the opposite protruding end split longitudinally and spread apart to confine the pipe diametrically compressed as and for the purpose set forth.

3. The combination of the damper-shaft formed at one end with the loop —l— separate disks —e—e— of wood or analogous material applied to opposite sides of said loop, and the rivet—i— passing through said disks and center of the loop and holding the loop partly embedded in the disks substantially in the manner set forth and shown.

4. In combination with the stove-pipe, a damper having its shaft passing through the pipe and provided at one end with a bearing on the exterior of the pipe and the opposite end of said shaft bent into a loop, disks of wood applied to opposite sides of the loop, a rivet tying the disks to the loop, a shield mounted on the shaft, and a spiral spring on the shaft between the disks and shield and pressing said shield against the pipe and compressing the same diametrically as set forth.

In testimony whereof I have hereunto signed my name this 16th day of March, 1893.

CHARLES T. REDFIELD.

Witnesses:
MARK W. DEWEY,
EDW. B. LYMAN.